United States Patent
Herrmann et al.

(10) Patent No.: US 10,139,213 B2
(45) Date of Patent: Nov. 27, 2018

(54) PROCESS AND APPARATUS FOR SETTING THE PARAMETERS OF THE SUSPENSION GEOMETRY OF THE WHEELS OF A VEHICLE

(71) Applicant: Dürr Assembly Products GmbH, Püttlingen (DE)

(72) Inventors: Armin Herrmann, Riegelsberg (DE); Joel Grub, Mittersheim (FR); Kurt Ismail, Völklingen (DE); Gerhard Heiduczek, Riegelsberg (DE)

(73) Assignee: DÜRR Assembly Products GmbH (DE)

( * ) Notice: Subject to any disclaimer, the term of this patent is extended or adjusted under 35 U.S.C. 154(b) by 120 days.

(21) Appl. No.: 15/106,215

(22) PCT Filed: Dec. 16, 2014

(86) PCT No.: PCT/DE2014/100450
§ 371 (c)(1),
(2) Date: Sep. 14, 2016

(87) PCT Pub. No.: WO2015/090281
PCT Pub. Date: Jun. 25, 2015

(65) Prior Publication Data
US 2016/0377407 A1    Dec. 29, 2016

(30) Foreign Application Priority Data

Dec. 19, 2013 (DE) .......................... 10 2013 114 579

(51) Int. Cl.
*G01B 5/255* (2006.01)
*G01B 21/26* (2006.01)

(52) U.S. Cl.
CPC ............. *G01B 5/255* (2013.01); *G01B 21/26* (2013.01); *G01B 2210/10* (2013.01)

(58) Field of Classification Search
CPC ...................................... G01B 5/255
USPC ............................... 33/203, 203.18
See application file for complete search history.

(56) References Cited

U.S. PATENT DOCUMENTS

| | | | | |
|---|---|---|---|---|
| 2,000,993 A | * | 5/1935 | Schmidt ................. | G01B 5/255 33/203.15 |
| 3,758,958 A | * | 9/1973 | Jordan ................... | G01B 5/255 33/203.15 |
| 4,261,108 A | * | 4/1981 | Davis ..................... | G01B 5/255 33/203.18 |
| 5,339,508 A | * | 8/1994 | Ventress ................ | B60G 15/07 29/252 |
| 5,369,602 A | * | 11/1994 | Naas ..................... | G01B 5/0025 33/203.18 |
| 5,724,743 A | * | 3/1998 | Jackson ............. | G01B 11/2755 33/203.18 |

(Continued)

*Primary Examiner* — G. Bradley Bennett
(74) *Attorney, Agent, or Firm* — Miller Canfield

(57) ABSTRACT

The present invention relates to a method and a device for adjusting the wheel alignment parameters of the wheels of a vehicle, wherein at least one vehicle axle is gripped by one gripping device per wheel axle, near the wheel flanges of the corresponding axle. According to the present invention, the gripping devices are moved by means of controllable drive means in such a way that the wheel alignment parameters of the wheels are adjusted via the orientation of the gripping devices.

10 Claims, 2 Drawing Sheets

(56) References Cited

U.S. PATENT DOCUMENTS

| | | | | |
|---|---|---|---|---|
| 8,760,641 B2* | 6/2014 | Grogan | ............... | G01B 11/2755 |
| | | | | 250/206.1 |
| 2003/0159298 A1* | 8/2003 | Mieling | ................. | G01B 5/255 |
| | | | | 33/203.15 |
| 2011/0113637 A1* | 5/2011 | Inoue | ................... | B60B 27/0005 |
| | | | | 33/203 |
| 2015/0121709 A1* | 5/2015 | Sudale | ............... | B62D 15/0225 |
| | | | | 33/203.18 |
| 2017/0089687 A1* | 3/2017 | Nourdine | ............... | G01B 5/255 |

* cited by examiner

PROCESS AND APPARATUS FOR SETTING THE PARAMETERS OF THE SUSPENSION GEOMETRY OF THE WHEELS OF A VEHICLE

PRIOR APPLICATIONS

This application claims priority to and all advantages of PCT/DE2014/100450, filed Dec. 16, 2014 and German Patent Application No. DE 102013114579.5, filed Dec. 19, 2013, the content of which is hereby incorporated by reference.

TECHNICAL FIELD

The present invention relates to a method and a device according to the preamble of claim 1 and of claim 6 for adjusting the wheel alignment parameters of the wheels of a vehicle.

BACKGROUND

A widely used procedure for adjusting the wheel alignment parameters at the rear axle of passenger cars consists in setting the specified toe and camber angles by selectively turning special eccentric adjusting screws. The eccentric movements are transmitted through the wheel suspension (toe, camber, spring link) to the hub carriers and the values to be adjusted are measured, for example, at the brake discs. The eccentric screws may also be rotated by servo-assisted drives or by tools from the field of threaded fasteners.

This procedure necessitates the provision of special adjusting tools with systems for positioning the tools relative to the adjusting screw and for interaction with the adjusting screw. If the adjusting screw is poorly accessible for design reasons, special tools (geared offset heads, right-angle gear drives) must be provided for carrying out the alignment work. To enable alignment work to be performed in short-cycle production lines, the adjusting tools must find the position of the adjusting screw automatically. This necessitates providing additional systems for the fine positioning of the tools relative to the screw.

The adjusting screws in the vehicle have to be configured as special-purpose screws. This involves additional costs. From the constructional aspect, the production process for the shift gates on the rear-axle supports is comparatively time-consuming. Furthermore, wear (abrasion) is identifiable between the eccentric screw and the rear-axle support. This puts a limit, which is dependent on the material combination axle body/screw, on the number of alignment attempts.

During performance of the alignment work, the axle may be gripped, for example, by gripping devices known from European Patent EP 1 503 363 B1. This patent discloses the use of a chuck system to support an axle's wheel flanges. The chuck system grips the axle's wheel flanges near to the outer periphery of the thrust-bearing discs for the brake discs and the wheels. The chuck system is designed such that it follows the movements relating to a change in the orientation of the axle's wheel plane.

SUMMARY

The objective of the present invention is to make adjustment of the wheel alignment parameters easier than is the case with the prior art.

This objective is established according to the present invention by a method of adjusting the wheel alignment parameters of wheels of a vehicle. At least one vehicle axle is gripped by one gripping device per wheel axle, near the wheel flanges of the axle in question. According to the present invention, the gripping devices are moved by means of controllable drive means in such a way that the wheel alignment parameters of the wheels are adjusted via the orientation of the gripping devices.

The axle-gripping devices are known to the extent that the axle is gripped herewith.

This gripping, as defined in the present invention, relates both to an embodiment in which appropriate parts of the vehicle axle are gripped by means of a chuck, for example, and also to an embodiment in which a securing element for the gripping device is secured, by means of additional securing means, to an appropriate axle counterpart. These securing means may be screws or bolts, for example. A securing element for the gripping device may be formed, for example, by an appropriate disc which, for execution of the alignment work, is screwed or bolted to the thrust bearing disc for the brake discs and the wheels. The same applies not only in connection with the method claims but also in connection with the device claims. Gripping by means of the chuck is advantageous with a view to cycle times, as securing and releasing of the gripping devices is easier and faster.

The known gripping devices follow the movements of the axle part gripped in each case during performance of the alignment work. These movements result from the fact that the known adjusting screws are moved correspondingly during the alignment work.

According to the solution offered by the present invention, each of the gripping devices is connected to controllable drive means. The gripping devices can be moved accordingly by these drive means. For this purpose, these gripping devices may be rotatable, via the drive means, in the wheel plane of the wheel in question as well as about an axis for adjustment of the toe angle and about an axis for adjustment of the camber angle.

To this end, a reference plane is defined for each of the gripping devices. The controllable drive means are then activated and adjusted until the position (inclination) of the wheel plane relative to the reference plane is in keeping with the specified toe and camber angles. It is evident in this context that the wheel need not have been fitted on the axle. The gripping device grips the axle in such a way that this gripping and the adjustment of the gripped axle parts via the orientation of the gripping device defines the wheel plane of a wheel fitted later on.

Whereas the gripping devices known from the prior art were configured such that they follow the changes in the wheel plane during performance of the alignment work, the procedure in the present invention is such that, with the securing means released to allow adjustment of the wheel alignment parameters, the wheel planes are oriented by the gripping devices.

The securing means in the present invention may, for example, be screws or bolts that are guided in a slot. Once the securing means have been released, movement along the slot is possible. This makes for a simpler construction—also with regard to the vehicle—for performance of the necessary alignment work than is the case with the hitherto known adjusting screws.

A further advantage consists in that the toe and camber angles can be adjusted simultaneously, thereby saving cycle time.

Simultaneously means here either that the angles in question are adjusted in one work step or that the two angles are adjusted separately, one immediately after the other.

If one of the respective angles (toe or camber angle) is being adjusted, it proves to advantage if the controllable drive means for the other angle (camber or toe angle) is disengaged. This means that the unit as a whole can follow the particular angle being adjusted without the controllable drive means for the other angle applying any force. This has the advantage of preventing stresses on the axle during the adjustment process, which would otherwise result from the interaction between toe and camber angles. The controllable drive means may be disengaged by connecting it up via a pneumatic brake (coupling). Whether forces can be introduced via a particular controllable drive element or whether it is disengaged, i.e. decoupled, is defined by the position of the pneumatic brake (coupling).

In another preferred embodiment of the method the axle is positioned in a first step in the gripping devices while the drive means is not activated. In a further step, the axle's securing means for the wheel alignment parameters are released from their locked position. In the next step, the gripping devices are adjusted, via the controllable drive means, according to the specified values of the wheel alignment parameters and are locked in this position. In a consecutive step, the axle's securing means for the wheel alignment parameters are locked in position again. The gripping devices are then released again in the following step.

Provided the drive means are not activated, the gripping devices are freely movable and are accordingly able, on being "applied" to the axle, to follow the momentary orientation of the wheel plane in question. The gripping devices are then able to grip the axle in such a way that, as they are applied to the axle, no forces are transmitted from the gripping devices to the axle. Should it be necessary for execution of the alignment work, a force may still be applied to the axle in order to simulate a specified weight to be taken up by the axle. This free mobility may, for example, be achieved with an embodiment with which the brakes (couplings) described above for the controllable drive means are released.

Once the securing means have been released, the wheel alignment parameters can be adjusted by activating the gripping devices' controllable drive means (and thereby causing the gripping devices to perform the appropriate rotary movements).

It may be advantageous, even before the securing means have been released from the locked position, to activate the controllable drive means for the gripping devices to the extent that the gripping devices are kept in their respective positions. Without this activation, the gripping devices would still be freely movable and would alter their position according to the forces of gravity occurring when the securing means are released from their locked position.

Once the wheel planes have been adjusted to the specified values by orienting the gripping devices by means of the controllable drive means, the controllable drive means are locked in the respective positions. Then the securing means are locked in position again. This may be realised, for example, by configuring the securing means as retaining screws/bolts that are tightened with a defined torque. The retaining screws/bolts may additionally be provided with a locknut to prevent them from accidental loosening. The parameters are then adjusted to completion and the gripping devices released again.

In another preferred embodiment for the method relates for an axle fitted in a vehicle. The weight of the vehicle is supported here by load-bearing elements.

For the present invention, this proves in so far advantageous as the securing means have to be temporarily released for adjustment of the wheel alignment parameters. If the vehicle weight is not otherwise supported in the case of an axle fitted in a vehicle, this weight would have to be taken up and moved accordingly by the controllable drive means.

In the another preferred embodiment, the drive means for the gripping devices are able to move in such a way as to allow them to follow the adjustment movements during orientation of the gripping devices.

This means that the controllable drive means are supported such that they actively effect the adjustment of the wheel plane in question but simultaneously are able to follow the position changes that occur during the adjustment.

The wheel's camber angle may be adjusted by making provision for the gripping device to be rotatable, by way of a servo-assisted drive, about a first axis, which runs in the horizontal plane. The wheel's toe angle may be adjusted by making provision for the gripping device to be rotatable about an axis running at least substantially in the vertical direction. This axis, however, is twisted out of the vertical orientation by the setting of a "camber angle not equal to zero".

In this embodiment, the controllable drive means are supported such that they are able to follow these movements but are still able to apply the necessary adjustment forces on the gripping device.

If, on account of the axle geometry, the fulcrum for adjustment of the wheel plane is not at the centre of the plane of the gripping device, by which the axle is gripped, it is furthermore necessary for the controllable drive means to be movable in the vehicle's longitudinal and transverse directions as well as in the vertical direction.

In another preferred embodiment, the weight of those parts of the axle that are not moved during orientation of the gripping device is supported by load-bearing elements.

This proves advantageous in so far as the weight to be supported and/or moved by the controllable drive means during execution of the alignment work is thereby further reduced.

Another embodiment of the invention relates to a device for carrying out the method, set forth in any one of the preceding claims, of adjusting the wheel alignment parameters of the vehicle's wheels. The device has a gripping device for gripping an axle by means of one gripping device per wheel axle, near the wheel flanges of the corresponding axle. According to the present invention, the gripping devices are moved by means of controllable drive means in such a way that the wheel alignment parameters of the wheels are adjusted via the orientation of the gripping devices.

As already explained above, the embodiment of the devices relates to the possibility of performing adjustments to the wheel geometry via the axle's gripping devices. From a constructional point of view, the advantage is that special adjusting tools adapted to the different axles need not be provided. Quite to the contrary, the gripping devices can now be configured such that the alignment work can be carried out via the gripping devices. The gripping devices are able to grip different axles without the drives requiring any design changes for purposes of parameter adjustment.

In another preferred embodiment, each of the gripping devices can be rotated about two axes via the controllable drive means, thereby making it possible to adjust both the toe angle and the camber angle. From a design point of view, configuring the controllable drive means as rotary drives is comparatively easy.

As already described above, the controllable drive means may be alternately disengaged, i.e. decoupled.

In another preferred embodiment, load-bearing elements are provided, which support the weight of the vehicle when the axle has already been fitted.

If the axle has already been fitted, it proves advantageous if the vehicle weight need not be carried and, during the alignment work, also moved by the controllable drive means. However, it is in principle also possible to perform the alignment work on the axle before it is fitted in the vehicle.

In another preferred embodiment, the drive means for the gripping devices are movably supported in such a way as to allow them to follow the adjustment movements during orientation of the gripping devices.

As already explained above, this means, also for this embodiment that the controllable drive means are supported such that they actively effect the adjustment of the wheel plane in question but simultaneously are able to follow the position changes that occur during the adjustment.

The wheel's camber angle may be adjusted by making provision for the gripping device to be rotatable, by way of a servo-assisted drive, about a first axis, which runs in the horizontal plane. The wheel's toe angle may be adjusted by making provision for the gripping device to be rotatable about an axis running at least substantially in the vertical direction. This axis, however, is twisted out of the vertical orientation by the setting of a "camber angle not equal to zero".

In this embodiment, the controllable drive means are supported such that they are able to follow these movements but yet are able to apply the necessary adjustment forces on the gripping device.

If, on account of the axle geometry, the fulcrum for adjustment of the wheel plane is not at the centre of the plane of the gripping device, by which the axle is gripped it is furthermore necessary for the controllable drive means to be movable in the vehicle's longitudinal and transverse directions as well as in the vertical direction.

In another preferred embodiment, load-bearing elements are provided via which the weight of those parts of the axle that are not moved during orientation of the gripping device is supported.

This proves advantageous in so far as the weight to be supported and/or moved by the controllable drive means during execution of the alignment work is thereby further reduced.

The controllable drive means according to the present invention may be powered electrically, pneumatically and/or hydraulically.

BRIEF DESCRIPTION OF THE DRAWINGS

An embodiment of the invention is shown in the drawings, wherein.

DETAILED DESCRIPTION

Figure 1:
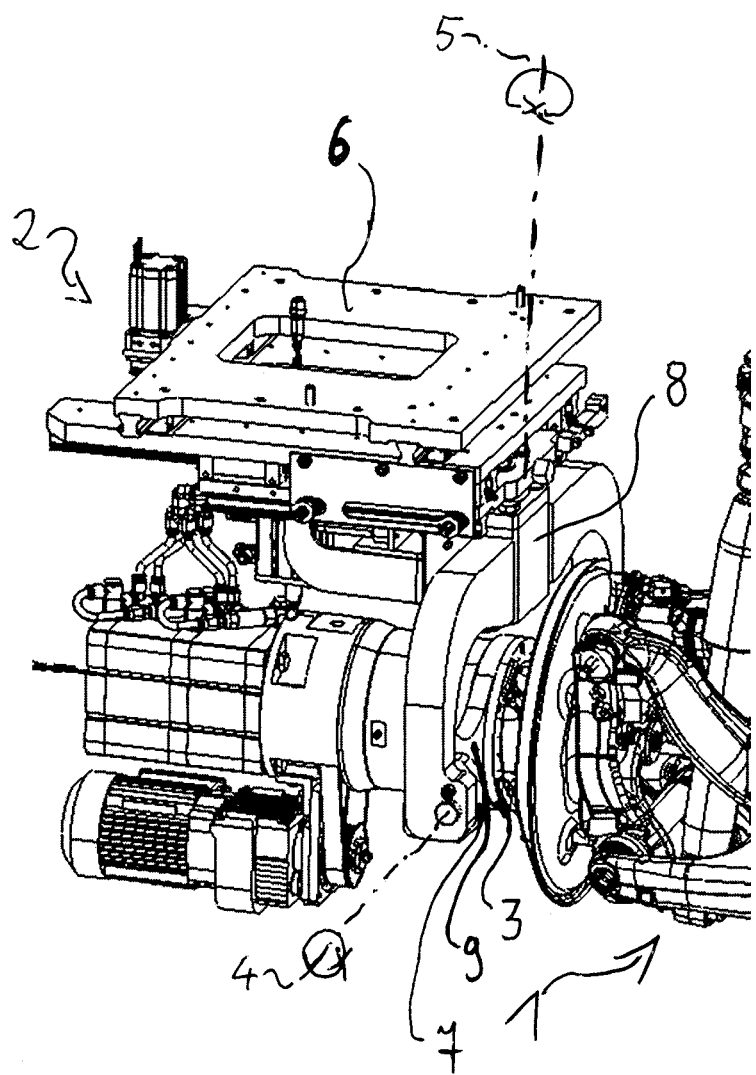
FIG. 1: shows a detailed view of a vehicle axle with a gripping device.

FIG. 1 shows part of a vehicle axle 1. A gripping device 2 is visible. In the drawing, this is attached to a thrust bearing disc 3 of the axle 1 in such a way as to allow the wheel alignment parameters to be adjusted via the gripping device 2.

For this purpose, the gripping device 2 has a controllable drive means 7 by means of which the gripping element 9 of the gripping device 2 can be rotated about the axis 4 shown in the drawing. The camber angle is adjusted by this rotary movement. The axis 4 is in the horizontal plane.

The gripping element 9 is connected to the thrust bearing disc 3 of the axle 1.

The gripping device 2 also has a further controllable drive means 8, by means of which the gripping device 2 can be rotated about the axis 5 shown in the drawing. This axis 5 is vertical.

The gripping device 2 is configured such that the axes 4 and 5 intersect at the point about which the wheel plane is rotated during adjustment of the wheel alignment parameters. This advantageously enables the gripping device 2 to be orientated by means of two rotary drives (7, 8) so as to make the adjustments.

It is evident from FIG. 1 that the controllable drive means 8 for adjusting the toe angle is configured in such a way that a support device 6 is rotated in order to adjust the toe angle. In this context, the support device 6 is rotated, relative to a support member 8, about a horizontal axis. For its rotation about a horizontal axis, the support device 6 has a receptacle for the controllable drive means 7. The gripping element 9, which acts directly on the thrust bearing disc 3 of the axle 1, is rotated about the horizontal axis 4, relative to the support device 6, via this controllable drive means 7.

In the embodiment shown in the drawing, the toe angle is adjusted by rotating the support device 6 about the axis 5 and thereby adjusting its orientation. The camber angle is adjusted by rotating the gripping element 9, relative to the support device 6, about a horizontal axis 4.

By virtue of this support device 6, the two axes 4 and 5 always intersect at the point about which the wheel plane is rotated during the alignment work.

Figure 2:
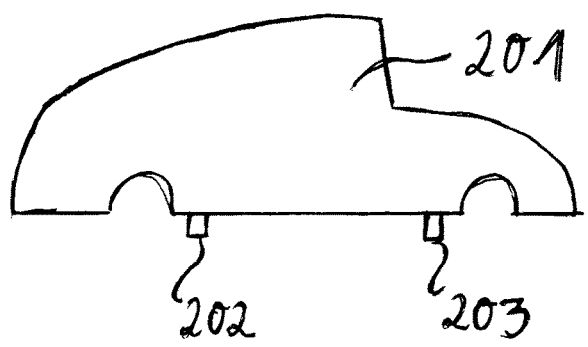
FIG. 2: shows an exemplary embodiment of load-bearing elements for a vehicle

FIG. 2 shows an exemplary embodiment of load-bearing elements 202 and 203 for a vehicle 201. The weight of the vehicle may be supported by the load-bearing elements 202 and 203. This is to advantage in the case of a fitted axle because the controllable drive means then do not need to support and, if need be, move this vehicle weight. The load-bearing elements may be positioned in the area of the frame side member of the vehicle 201, for example at the customary jacking points.

Figure 3:
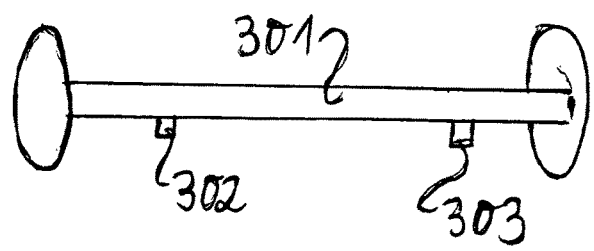
FIG. 3: shows an exemplary embodiment of load-bearing elements for an axle.

FIG. 3 shows a vehicle axle 301. It shows that those parts of this vehicle axle 301 that are not moved during adjustment of the wheel alignment parameters may be supported via load-bearing elements 302, 303. This again reduces the load on the controllable drive means during the alignment work.

Obviously, many modifications and variations of the present invention are possible in light of the above teachings. The foregoing invention has been described in accordance with the relevant legal standards; thus, the description is merely exemplary than limiting in nature. Variations and modifications to the disclosed embodiment may become apparent to those skilled in the art and do come within the scope of the invention. Accordingly the scope of the legal protection afforded this invention can only be determined by studying the following claims.

The invention claimed is:

1. Method for adjusting the wheel alignment parameters of the wheels of a vehicle, at least one vehicle axle being gripped by one gripping device (2) per wheel axle, near the wheel flanges of the axle in question, characterized in that, when the securing means have been released to allow adjustment of the wheel alignment parameters, the gripping devices (2) are moved via controllable drive means (7, 8) in such a way (4, 5) that the wheel alignment parameters of the wheels are adjusted via the orientation of the gripping devices (2).

2. Method according to claim 1, characterized in that, in a first step, the axle (1) is positioned in the gripping devices (2) while the drive means (7, 8) are not activated, that in a further step, the axle's (1) securing means for the wheel alignment parameters are released from their locked position, that in the next step, the gripping devices (2) are adjusted, via the controllable drive means (7, 8), according to the specified values of the wheel alignment parameters and are locked in this position, that in a consecutive step the axle's (1) securing means for the wheel alignment parameters are locked in position again and that the gripping devices (2) are then released again in the following step.

3. Method according to claim 1,
characterized in that, in the case of an axle fitted in a vehicle (201), the weight of the vehicle (201) is supported by load-bearing elements (202, 203).

4. Method according to claim 1, characterized in that the drive means (7, 8) for the gripping devices (2) are able to move in such a way as to allow them to follow the adjustment movements during orientation of the gripping devices (2).

5. Method according to claim 4, characterized in that the weight of those parts of the axle (301) that are not moved during orientation of the gripping devices (2) is supported by load-bearing elements (302, 303).

6. Device for carrying out the method, as set forth in any one of the preceding claims, of adjusting the wheel alignment parameters of the wheels of a vehicle, the device having a gripping device for gripping an axle by means of one gripping device per axle, near the wheel flanges of the axle in question, characterized in that, when the securing means have been released to allow adjustment of the wheel alignment parameters, the gripping devices (2) can be moved via controllable drive means (7, 8) in such a way that the wheel alignment parameters of the wheels are adjusted via the orientation of the gripping devices (2).

7. The device of claim 6, characterized in that each of the gripping devices (2) can be rotated about two axes (4, 5) via the controllable drive means (7, 8).

8. The device of claim 6, characterized in that load-bearing elements (202, 203) are provided which, in the case of an axle fitted in a vehicle (201), support the weight of the vehicle (201).

9. The device claim 6, characterized in that the drive means (7, 8) for the gripping devices (2) are movably supported in such a way as to allow them to follow the adjustment movements during orientation of the gripping devices (2).

10. The device of claim 9, characterized in that load-bearing elements (302, 303) are provided, which support the weight of those parts of the axle (301) that are not moved during orientation of the gripping devices (2).

* * * * *